(12) United States Patent
Nelson

(10) Patent No.: US 8,904,968 B1
(45) Date of Patent: Dec. 9, 2014

(54) AUTOMATIC SPRAY MECHANISM

(71) Applicant: Eric J. Nelson, Lubbock, TX (US)

(72) Inventor: Eric J. Nelson, Lubbock, TX (US)

( * ) Notice: Subject to any disclaimer, the term of this patent is extended or adjusted under 35 U.S.C. 154(b) by 0 days.

(21) Appl. No.: 13/731,353

(22) Filed: Dec. 31, 2012

(51) Int. Cl.
*A01K 15/00* (2006.01)

(52) U.S. Cl.
USPC .......................................... 119/712; 119/720

(58) Field of Classification Search
USPC .................... 119/712, 905, 719, 720; 239/276
See application file for complete search history.

(56) References Cited

U.S. PATENT DOCUMENTS

| | | | | |
|---|---|---|---|---|
| 5,009,192 | A * | 4/1991 | Burman | 119/720 |
| 5,224,652 | A * | 7/1993 | Kessler | 239/211 |
| 5,458,093 | A * | 10/1995 | MacMillan | 119/720 |
| 5,501,179 | A * | 3/1996 | Cory | 119/712 |
| 5,603,287 | A * | 2/1997 | Houck | 119/719 |
| 5,845,984 | A * | 12/1998 | Bonilla | 362/101 |
| 6,202,594 | B1 * | 3/2001 | Kirschner | 119/72 |
| 6,700,486 | B1 * | 3/2004 | Banki | 340/541 |
| 7,658,166 | B1 * | 2/2010 | Rheinschmidt et al. | 119/718 |
| 7,690,146 | B2 * | 4/2010 | Jong et al. | 43/1 |
| 2003/0094507 | A1 | 5/2003 | Anzivino | |
| 2008/0041321 | A1 * | 2/2008 | Jong et al. | 119/719 |
| 2009/0025652 | A1 * | 1/2009 | Jong | 119/720 |
| 2009/0120374 | A1 | 5/2009 | Hansen | |
| 2011/0174226 | A1 * | 7/2011 | Huber | 119/69.5 |
| 2012/0137987 | A1 * | 6/2012 | Moulin | 119/719 |

OTHER PUBLICATIONS

IRC ScareCrow Automatic Outdoor Sprinkler. http://www.sears.com/shc/s/p_10153_12605_SPM241773200P?sid=IDx20101019x00001a&ci_src=14110944&ci_sku=SPM241773200.

* cited by examiner

*Primary Examiner* — Yvonne Abbott
(74) *Attorney, Agent, or Firm* — Robert C. Montgomery; Montgomery Patent & Design

(57) ABSTRACT

An automatic spray mechanism provides a deterrent to keep animals away from flower beds and other restricted areas in a yard. The mechanism comprises a bottle which is filled with a liquid and inserted into a holder having a plurality of anchors which enables it to be secured into the ground. The top of the bottle comprises a powered spraying assembly comprising a pump, a suction tube, and a directionally adjustable spray nozzle. The mechanism is activated by an electronic motion sensor so when an animal such as a cat, dog, or wild animal approaches, it sprays the liquid.

12 Claims, 4 Drawing Sheets

AUTOMATIC SPRAY MECHANISM

RELATED APPLICATIONS

There are no current co-pending applications.

FIELD OF THE INVENTION

The presently disclosed subject matter is directed to an automatic mechanism that dispenses a chemical deterrent to repel any unwanted animals from entering an area.

BACKGROUND OF THE INVENTION

The invention described herein pertains to an automatic spray mechanism for deterring animals. Domestic animals often run through gardens resulting in trampled, displaced plants. Additionally, gardens can attract unwanted wild animals that eat the plants and further disrupt the garden bed. Although fences can effectively deter some larger animals from entering a garden area, they often detract from the aesthetic appearance of a garden while not being as effective for smaller more persistent animals. Electric fences are an effective alternative for domestic animals, but provide no protection from wild animals. Multiple attempts have been made at deterring animals from entering a garden or restricted area, however, there is a persistent need for an inconspicuous and effective animal deterring device.

U.S. Pat. No. 7,690,146 to Chiou-Muh Jong discloses a device for deterring larger animals from a garden without the use of a fence. The '146 patent describes a dummy, similar to a scarecrow, having a sound-emitting device as well as a water spraying means coupled to a motion detector. When motion is detected signaling the presence of an animal, a sound similar to a shotgun being fired is emitted in conjunction with a short burst of water being sprayed. As disclosed, the spraying means is not easily adjustable, and the dummy is impractical for small gardens due to its size.

Another attempt at deterring animals is disclosed in U.S. Pat. No. 5,458,093 to Danny C MacMillan. This patent describes a motion sensor affixed to a sprinkler for deterring animals. The motion sensor has a traditional power cord which needs a power outlet for operation, while the sprinkler requires a hose for the water supply. The need for both a power outlet and a hose precludes the use of multiple devices at one (1) time. Additionally, the device utilizes a large, noticeable motion detector along with a fixed position sprinkler head. Furthermore, repeated triggering of the device will result in over-watering of a garden due to the volume of water involved in each spray.

Although the various devices observed may fulfill their individual, particular objectives, each device suffers from one (1) or more disadvantage or deficiency related to design or function. Whether taken singly, or in combination, none of the observed devices disclose the specific arrangement and construction of the instant invention.

SUMMARY OF THE INVENTION

The inventor has recognized the deficiencies in the art pertaining to automatic spray mechanisms for deterring animals from entering a specific area. Furthermore, the inventor has observed that there is a need for inconspicuous, adjustable, self-powered automatic spray devices which do not overwater a garden in response to multiple sprays.

The inventor has addressed at least one (1) of the problems observed in the art by developing a novel apparatus for detecting motion and spraying a liquid solution. It is a feature and aspect of the present invention to provide a battery-powered automatic spraying assembly. According to a preferred embodiment, an electronic motion sensor is coupled to the automatic spray assembly which propels a mist pattern or stream of fluid when motion is detected. The motion sensor is preferably an infrared-type sensor, thermally-activated unit, or other equivalent switching sensor type.

It is another aspect of the invention to provide an anchoring assembly for receiving a translucent plastic vessel. The plastic vessel has a threaded attachment means for securing a spraying assembly body thereto. Within the spraying assembly body is a pump/motor in fluid communication with the plastic vessel. The pump/motor propels fluid from within the plastic vessel up and out through the spray head. Additionally contained within the spraying assembly body and accessibly via a battery compartment cover is a DC battery. Disposed on the spraying assembly body and coupled with the battery, motion sensor and pump/motor is a sliding power switch.

It is yet another aspect of the invention to provide a top mounted spray head and an orbitally-adjustable swivel nozzle disposed on the spraying assembly body. The orbitally-adjustable swivel nozzle has a ball-and-socket type design and is disposed within the top mounted spray head. The spray head is horizontally adjustable while the swivel nozzle is vertically and horizontally adjustable. The combination of the spray head and swivel nozzle allow for accurate and easy adjustment of spray direction.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawing and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
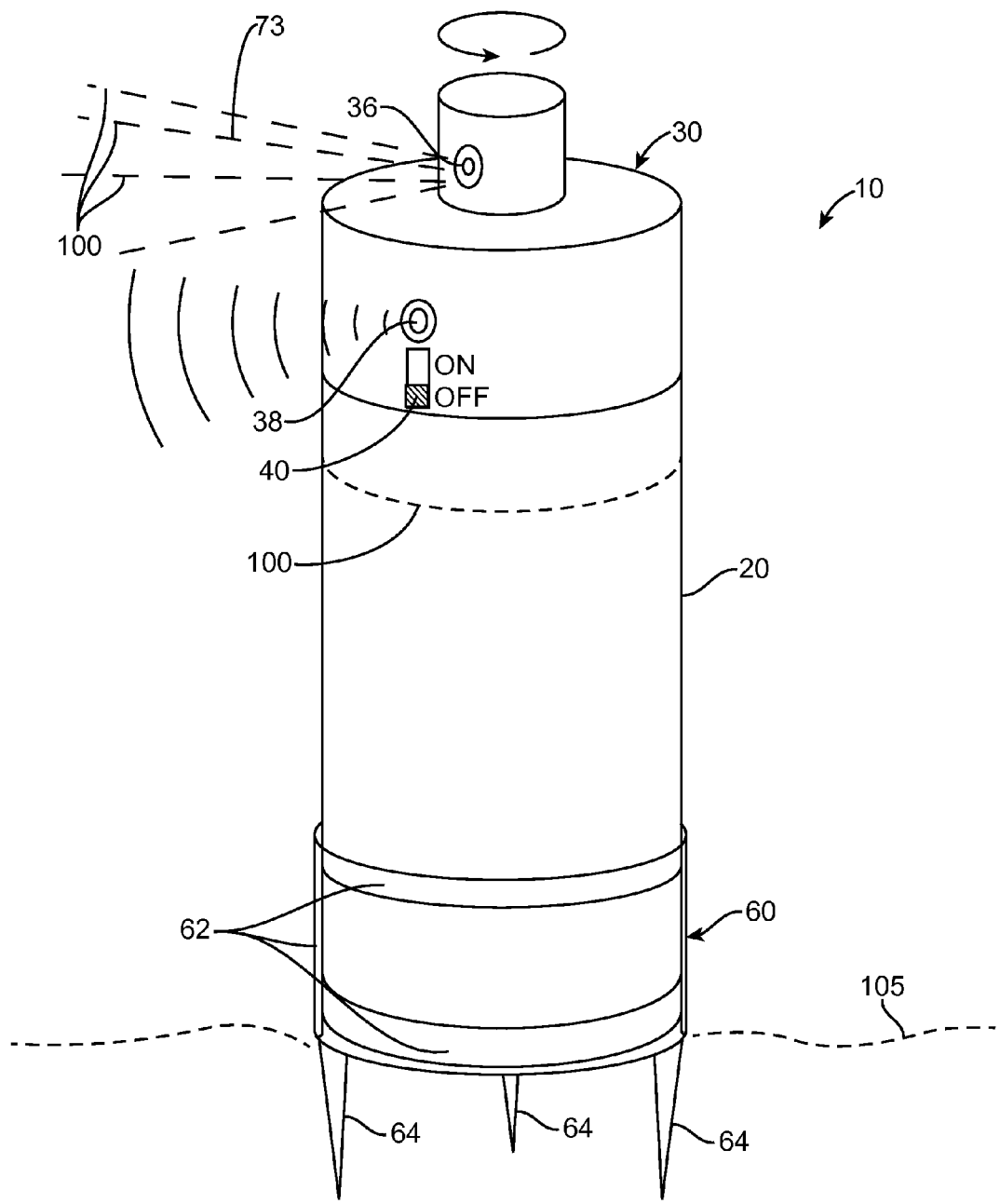
FIG. 1 is a perspective view of an automatic spray mechanism 10, according to a preferred embodiment of the present invention.

- 10 automatic spray mechanism
- 20 vessel
- 22 threaded spout
- 30 spraying assembly
- 32 body
- 34 spray head
- 35 rotary fitting 36 swivel nozzle
37 flexible hose
38 motion sensor
40 power switch
42 tubing
44 threaded spout receiver
46 pump/motor
48 battery
49 wiring
50 battery compartment cover
52 latch
60 anchoring assembly
62 frame
64 spike leg
71 y-axis
72 x-axis
73 horizontal and vertical trajectories
100 fluid
105 ground surface

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an automatic spray mechanism (herein described as the "apparatus") 10, which provides an automatic spray deterrent to keep animals away from restricted areas such as flower beds, and other portions of a yard. The apparatus 10 comprises a plastic vessel 20, a battery-powered automatic spraying assembly 30 in fluid communication with vessel 20, and an anchoring assembly 60 coupled to vessel 20. The apparatus 10 is activated by an electronic motion sensor 38; thus, when a cat, dog, or wild animal approaches the apparatus 10, a mist pattern or stream of fluid 100 is propelled to deter the animal. Advantageously, when an animal approaches vessel 20, automatic spraying assembly 30 causes automatic propulsion of fluid 100 outwardly and away from vessel 20 towards the animal such that the animal is automatically deterred from approaching the restricted area.

The apparatus 10 provides a timely and convenient means to refill the fluid 100, replace the battery 48, or even to remove the vessel 20 for storage indoors in the event of freezing weather. The use of the apparatus 10 provides a means to keep pets and wild animals out of flowerbeds, gardens, and other restricted yard areas in a non-toxic and humane manner.

Figure 2:
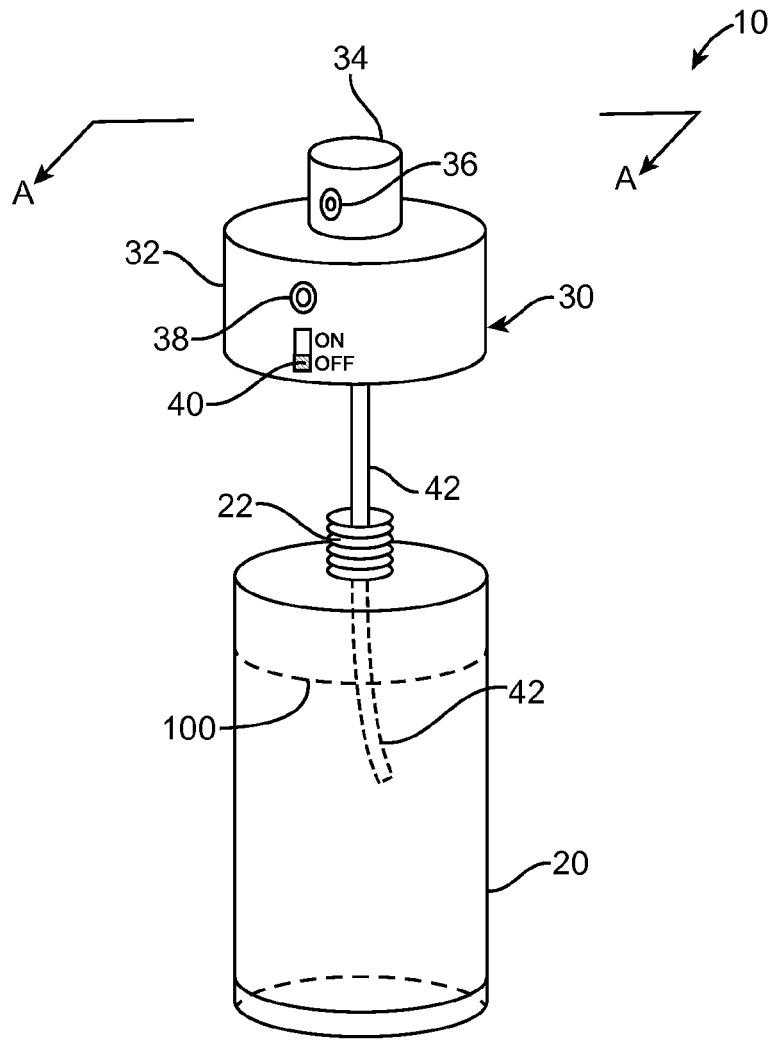
FIG. 2 is an exploded view of the automatic spray mechanism 10, according to a preferred embodiment of the present invention.

Referring now to FIGS. 1 and 2, perspective and exploded views of the apparatus 10, according to a preferred embodiment of the present invention, are disclosed. The apparatus 10 comprises a transparent or translucent vessel 20 having a volumetric capacity of approximately sixteen ounces (16 oz.) which is to be filled with a fluid such as, but not limited to: water, ammonia, or other animal deterring solution. The vessel 20 further comprises an integrally-molded threaded spout 22 centered upon a top surface which provides threaded attachment to the spraying assembly 30.

Figure 3:
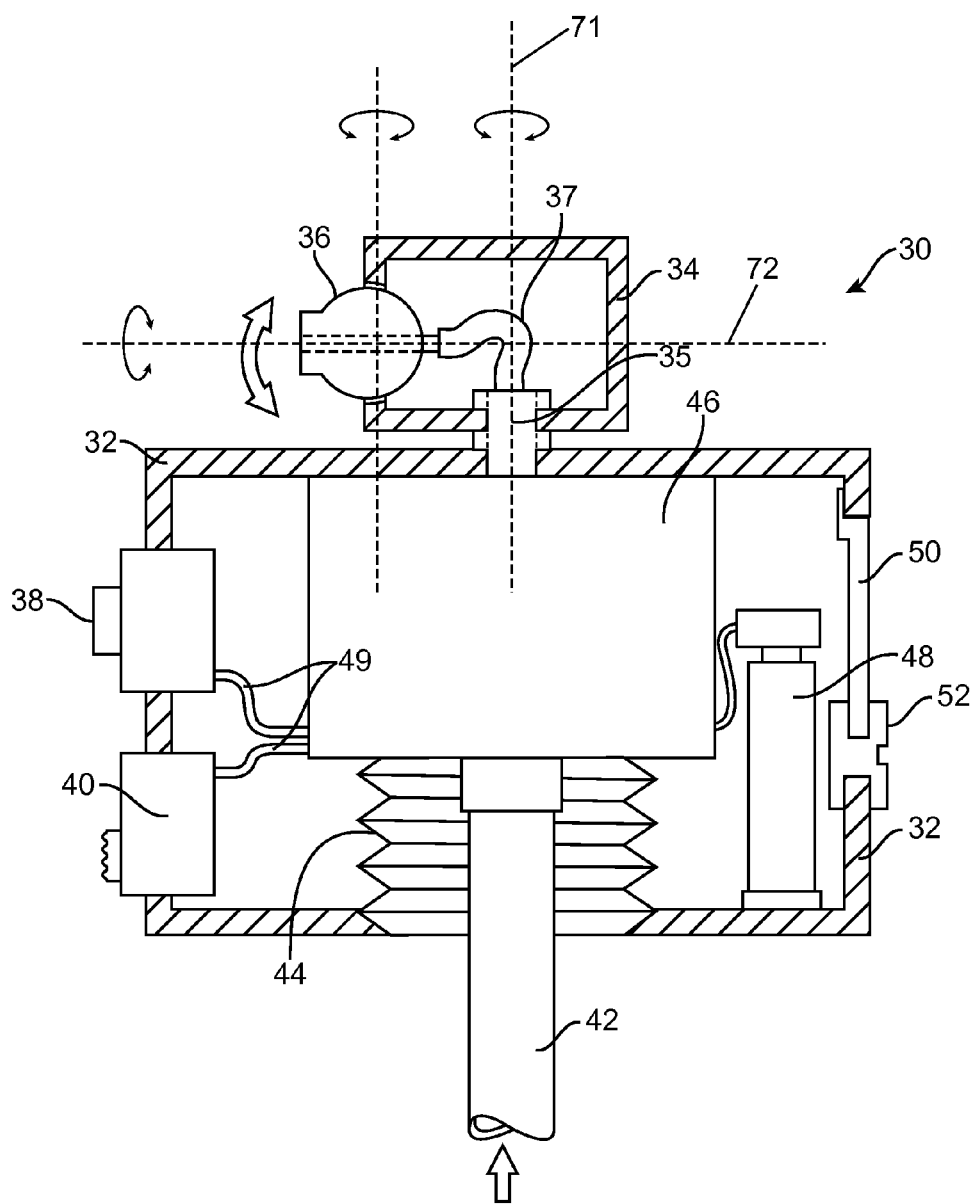
FIG. 3 is a section view of the automatic spray mechanism 10 taken along section line A-A (see FIG. 2), according to a preferred embodiment of the present invention; and, FIG. 4 is an electrical block diagram of the automatic spray mechanism 10, according to a preferred embodiment of the present invention.

The threaded spout 22 provides a threaded attachment means to a correspondingly sized and threaded spout receiver portion 44 located along a bottom surface of the spraying assembly 30 (see FIG. 3). The spraying assembly 30 provides a battery-powered means to automatically emit a spray or stream of fluid 100 upon electronic detection of an animal. The spraying assembly 30 comprises a body 32 having a top-mounted spray head 34 capable of rotating along a horizontal plane via an interconnecting rotary fitting 35, thereby allowing a user to aim the apparatus 10 as desired. Said spray head 34 comprises additional fluid 100 directing means via an orbitally-adjustable swivel nozzle 36 envisioned to comprise a ball-and-socket-type design to enable a user to manually aim and direct the fluid 100 as desired.

It is understood that a plurality of units of the apparatus 10 may be purchased and utilized coincidentally, based upon a size of an area requiring protection from animals.

The apparatus 10 is envisioned to be secured to a ground surface 105 by inserting the vessel 20 into a cylindrical anchoring assembly 60. The anchoring assembly 60 comprises a metal or plastic open-topped frame 62 being sized so as to slidingly receive the vessel 20 within. The frame 62 further provides a plurality of downwardly-pointing integral spike leg portions 64 being approximately three inches (3 in) in length which provide sufficient penetration of said ground surface 105 so as to result in a stable installation of the apparatus 10. It is envisioned that the vessel 20, spraying assembly body 32, and anchoring assembly frame 62 comprise matching geometry.

Referring now to FIG. 3, a section view of the apparatus 10 taken along section line A-A (see FIG. 2), according to a preferred embodiment of the present invention, is disclosed. The body portion 32 of the spraying assembly 30 provides a housing means to internal components necessary to automatically initiate and propel the fluid 100, including an electronic motion sensor 38, a power switch 40, fluid tubing 42, a pump/motor 46, and, at least one (1) DC battery 48.

In use, the pump/motor 46 is in fluid communication with the aforementioned vessel 20 via the tubing 42, which in turn draws the fluid 100 up out of the vessel 20 and propels said fluid 100 through the rotary fitting 35 and into the spray head 34. In addition to acting to convey the fluid 100, the rotary fitting 35 provides integral spool-shaped features which attach the body 32 to the spray head 34 while allowing relative rotary motion. The fluid 100 is then subsequently propelled through a short length of flexible hose 37 within the spray head 34, which establishes flexible fluid communication between the rotary fitting 35 and the swivel nozzle 36.

The rotary fitting 35 and swivel nozzle 36 allow a user to adjust the direction of the sprayed fluid 100 vertically and horizontally, respectively, thereby adapting to a particular surrounding area and/or a particularly sized animal. The pump/motor 46 is to be capable of pressurizing and propelling the fluid 100 across an area to be protected such as a walkway, flower garden, or the like. Electrical power to the pump/motor 46 is controlled by a two-position sliding power switch 40 and supplied by at least one (1) battery 48. The battery 48 is accessible for periodic replacement via a battery compartment cover 50 located along a side surface of the body 32, being secured in place via a quarter-turn latch 52.

The pump/motor 46 is activated by an electronic motion sensor 38 located along a side surface of the body 32. The motion sensor 38 is to be capable of detecting an animal such as a cat, dog, or wild animal as it approaches the apparatus 10. Upon detection, the apparatus 10 propels a spray of fluid 100 onto said animal. The fluid 100 preferably takes a form of a mist pattern approximately three to five inches (3-5 in.) in diameter.

Figure 4:
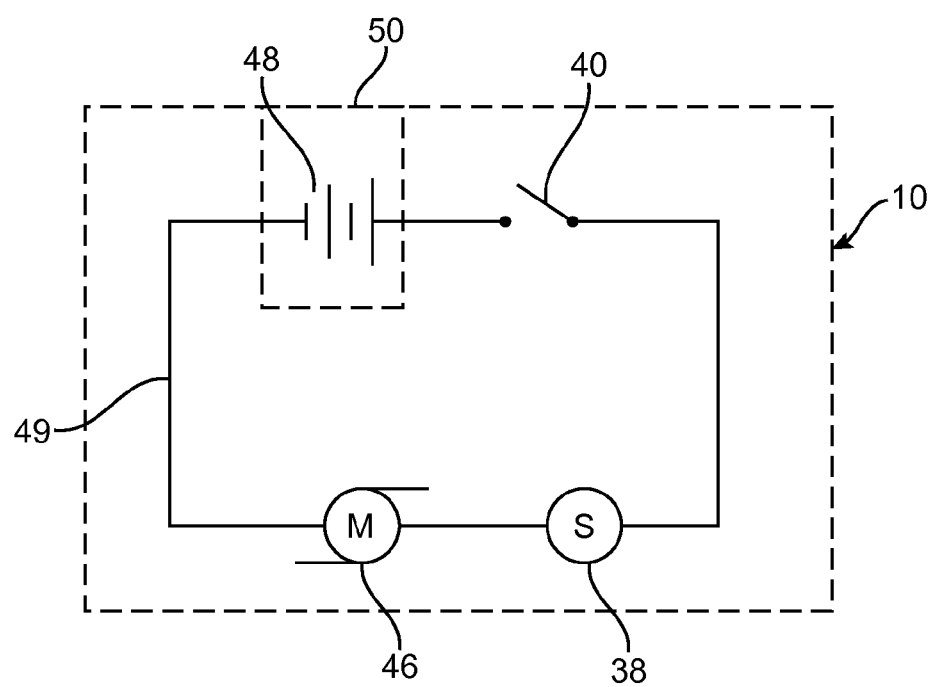

Referring now to FIG. 4, an electrical block diagram of the apparatus 10, according to a preferred embodiment of the present invention, is disclosed. Electrical power is provided to the apparatus 10 by at least one (1) rechargeable or disposable DC battery 48. Said power is controlled via a two-position sliding power switch 40 or equivalent switching means. The battery 48, power switch 40, motion sensor 38, and pump/motor 46 are in electrical communication with each other via common wiring 49 forming a simple DC circuit. The motion sensor 38 is preferably an infrared-type sensor or may utilize a thermally-activated unit or other equivalent switching sensor type. Once electrically energized, and upon sensing the presence of an animal, the sensor 38 switches and conducts power to the pump/motor 46. The pump/motor 46 is envisioned to comprise a miniature DC unit capable of pressurizing and propelling the fluid 100 a sufficient distance.

In a non-limiting exemplary embodiment, the automatic spraying assembly 30 includes a body 32 having an open spout receiver portion 44 formed at a bottom surface thereof. A sensor 38 is located at body 32 and a power switch 40 located at body 32. A pump 46 is entirely housed within body 32, and tubing 42 in fluid communication with pump 46. Such tubing 42 is removably located within vessel 20. Also, power source 48 is entirely housed within body 20 and is communicatively coupled to pump 46. In this manner, while power switch 40 is at an on position, pump 46 is automatically activated when sensor 38 detects the animal.

In a non-limiting exemplary embodiment, the automatic spraying assembly 30 further includes a rotary fitting 35 extending outwardly from body 32 and is in fluid communication with pump 46. A spray head 34 is rotatable coupled to rotary fitting 35 and located above body 32. Flexible hose 37 is entirely located within spray head 34 such that swivel nozzle 36 is in fluid communication with flexible hose 37. Notably, swivel nozzle 36 extends outwardly from spray head 34. Advantageously, rotary fitting 35 has concentrically spaced spool-shaped features simultaneously attached to body 32 as well as spray head 34, respectively. In this manner, spray head 34 is rotationally motioned relative to stationary positions of body 32 and rotary fitting 35, respectively.

In a non-limiting exemplary embodiment, rotary fitting 35 remains stationary while spray head 34 and swivel nozzle 36 are simultaneously rotated along a y-axis 71 and an x-axis 72, respectively, thereby allowing a user to simultaneously adjust horizontal and vertical trajectories (collectively at 73) of fluid 100, respectively.

In a non-limiting exemplary embodiment, swivel nozzle 36 is orbitally-adjustable relative to spray head 34.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIG. 1.

The method of installing and utilizing the apparatus 10 may be achieved by performing the following steps: procuring at least one (1) unit of the apparatus 10; unthreading and removing the vessel 20 from the spraying assembly 30; removing the battery compartment cover 50 using the latch 52; installing at least one (1) fresh battery 48; replacing and locking the battery compartment cover 50; filling the vessel 20 with an animal deterring fluid 100 such as water, ammonia, or other animal deterring solution; installing the anchoring assembly 60 at a desired location where unwanted animals are likely to pass by, by pushing the spike leg portions 64 down into the ground surface 105; inserting a bottom portion of the vessel 20 into the frame portion 62 of the anchoring assembly 60; adjusting the direction of the spray of the fluid 100 horizontally by rotating the spray head 34 or by rotating the vessel 20 within the anchoring assembly 60; adjusting the direction of the spray of fluid 100 vertically by manipulating the swivel nozzle 36 up or down as desired; installing additional units of the apparatus 10 as desired based upon a size of the area to be protected; moving the power switch 40 to the "ON" position; allowing the apparatus 10 to function in an automatic manner over a period of time to deter animals; inspecting a level of the fluid 100 within the vessel 20 periodically, and refilling the fluid 100 when required; and, benefiting from an automatic and humane deterrent means to remove unwanted animals afforded a user of the present invention 10.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. An automatic spray mechanism for keeping animals away from a restricted area, said automatic spray mechanism comprising:
   a vessel capable of containing fluid therein, comprising a spout centered upon a top surface thereof;
   an automatic spraying assembly in fluid communication with said vessel and removably attached to said spout; and,
   an anchoring assembly coupled to said vessel and capable of being removably located at a ground surface;
   wherein, when an animal approaches said vessel, said automatic spraying assembly causes propulsion of the fluid outwardly and away from said vessel towards the animal such that the animal is deterred from approaching the restricted area.

2. The automatic spray mechanism of claim 1, wherein said anchoring assembly comprises:
   an open-topped frame slidingly receiving said vessel therein; and,
   a plurality of downwardly-pointing spike leg portions capable of providing sufficient penetration into the ground surface so as to result in a stable installation of said automatic spray mechanism at the ground surface.

3. The automatic spray mechanism of claim 1, wherein said automatic spraying assembly comprises:
   a body having an open spout receiver portion formed at a bottom surface thereof;
   a sensor located at said body;
   a power switch located at said body;
   a pump entirely housed within said body;
   a tubing in fluid communication with said pump and removably located within said vessel; and, a power source entirely housed within said body and communicatively coupled to said pump;

wherein, while said power switch is at an on position, said pump is automatically activated when said sensor detects the animal.

4. The automatic spray mechanism of claim 3, wherein said automatic spraying assembly further comprises:

a rotary fitting extending outwardly from said body and being in fluid communication with said pump;

a spray head rotatable coupled to said rotary fitting and located above said body;

a flexible hose entirely located within said spray head; and, a swivel nozzle in fluid communication with said flexible hose and extending outwardly from said spray head;

wherein said rotary fitting has concentrically spaced spool-shaped features simultaneously attached to said body as well as said spray head, respectively; and, wherein said spray head is rotationally motioned relative to stationary positions of said body and said rotary fitting, respectively.

5. The automatic spray mechanism of claim 4, wherein said rotary fitting remains stationary while said spray head and said swivel nozzle are simultaneously rotated along a y-axis and an x-axis, respectively, thereby simultaneously adjusting horizontal and vertical trajectories of the fluid, respectively.

6. The automatic spray mechanism of claim 5, wherein said swivel nozzle is orbitally-adjustable relative to said spray head.

7. An automatic spray mechanism for keeping animals away from a restricted area, said automatic spray mechanism comprising:

a vessel capable of containing fluid therein, comprising a spout centered upon a top surface thereof;

an automatic spraying assembly in fluid communication with said vessel and removably attached to said spout; and, an anchoring assembly coupled to said vessel and capable of being removably inserted into a ground surface adjacent to the restricted area;

wherein, when an animal approaches said vessel, said automatic spraying assembly causes automatic propulsion of the fluid outwardly and away from said vessel towards the animal such that the animal is automatically deterred from approaching the restricted area.

8. The automatic spray mechanism of claim 7, wherein said anchoring assembly comprises:

an open-topped frame slidingly receiving said vessel therein; and, a plurality of downwardly-pointing spike leg portions capable of providing sufficient penetration into the ground surface so as to result in a stable installation of said automatic spray mechanism at the ground surface.

9. The automatic spray mechanism of claim 7, wherein said automatic spraying assembly comprises:

a body having an open spout receiver portion formed at a bottom surface thereof;

a sensor located at said body;

a power switch located at said body;

a pump entirely housed within said body;

a tubing in fluid communication with said pump and removably located within said vessel; and, a power source entirely housed within said body and communicatively coupled to said pump;

wherein, while said power switch is at an on position, said pump is automatically activated when said sensor detects the animal.

10. The automatic spray mechanism of claim 9, wherein said automatic spraying assembly further comprises:

a rotary fitting extending outwardly from said body and being in fluid communication with said pump;

a spray head rotatable coupled to said rotary fitting and located above said body;

a flexible hose entirely located within said spray head; and, a swivel nozzle in fluid communication with said flexible hose and extending outwardly from said spray head;

wherein said rotary fitting has concentrically spaced spool-shaped features simultaneously attached to said body as well as said spray head, respectively; and, wherein said spray head is rotationally motioned relative to stationary positions of said body and said rotary fitting, respectively.

11. The automatic spray mechanism of claim 10, wherein said rotary fitting remains stationary while said spray head and said swivel nozzle are simultaneously rotated along a y-axis and an x-axis, respectively, thereby simultaneously adjusting horizontal and vertical trajectories of the fluid, respectively.

12. The automatic spray mechanism of claim 11, wherein said swivel nozzle is orbitally-adjustable relative to said spray head.

* * * * *